Dec. 1, 1970     J. R. BESSON ET AL     3,544,216
DOUBLE-PULSE LASER TELEMETER SYSTEM
Filed Nov. 16, 1967
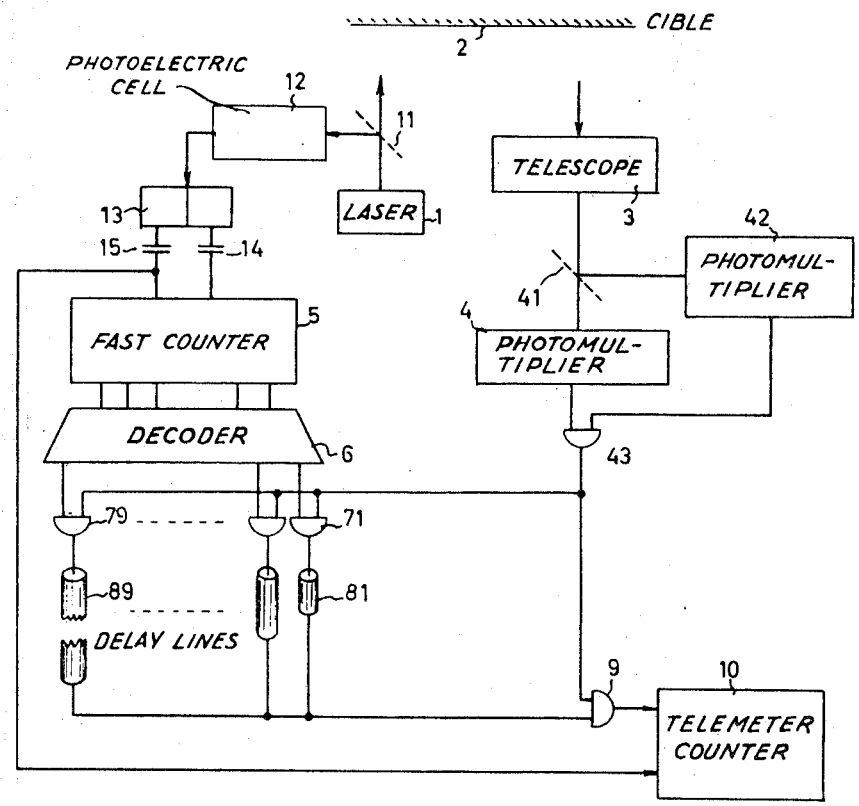
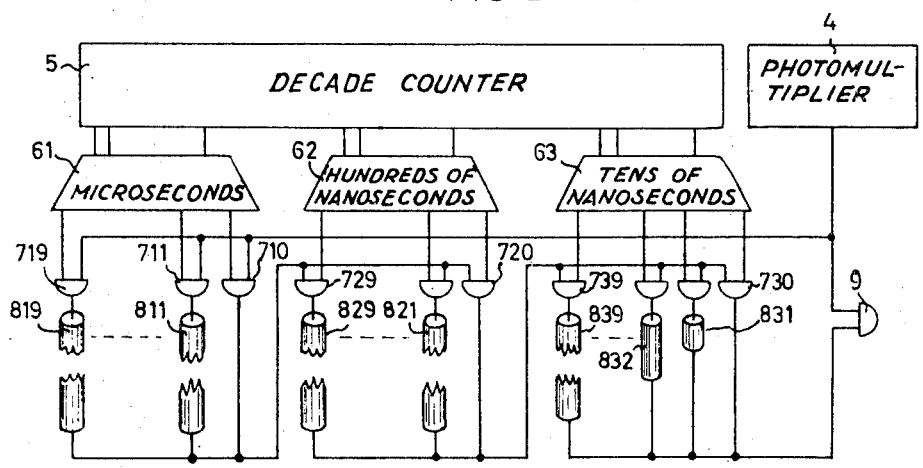
INVENTORS:
Jean Rene BESSON
Pierre Francois WEBER
By Abraham A. Saffitz
ATTORNEY United States Patent Office 3,544,216
Patented Dec. 1, 1970

3,544,216
DOUBLE-PULSED LASER TELEMETER SYSTEM
Jean Rene Besson, Boulogne-Billancourt, and Pierre Francois Weber, Paris, France, assignors to Office National d'Etudes et de Recherches Aerospatiales, Chatillon-sous-Bagneuz, France, a body corporate of France
Filed Nov. 16, 1967, Ser. No. 683,618
Claims priority, application France, Nov. 21, 1966, 84,375
Int. Cl. G01c 3/08
U.S. Cl. 356—5      3 Claims

ABSTRACT OF THE DISCLOSURE

The specification discloses a laser telemeter system using a solid state laser which is so triggered as to deliver a pair of pulses in response to reach triggering, a photoelectric receiving cell such as a photomultiplier tube and a telemeter counter. The time interval between the two pulses forming each pair is measured and employed for selecting a delay line having a corresponding time constant from a plurality of delay lines. The telemeter counter is started by the second pulse of each pair and stopped by the output signal of an AND-gate having a first input connected to the outputs of all the delay lines and a second input connected to the output of the photomultiplier tube whereby every telemeter measurement employs the second of two pulses separated by the last measured interval.

---

This invention is for improvements in or relating to laser telemeter, more particularly to a double-pulse laser telemeter system.

The range of laser telemeter systems used to measure target distance by measurement of the time between the transmission of a light pulse by a laser transmitter towards the target and the reception of an echo light pulse by a receiver disposed near the transmitter, is limited more particularly by receiver noise and by interfering light signals reaching the receiver.

Since the receiver comprises an optical system for receiving the echo and at least one detector—as a rule, a photomultiplier—for converting received light pulses into electrical signals, receiver noise is composed predominantly of photomultiplier noise caused by thermanionic emission from the cathode, ionisation of residual gases in the multiplier tube, field effects, light reactions and ohmic leaks. Cooling the photomultiplier helps to reduce some of these noises, more particularly the noises due to thermionic emission from the cathode. Another known way of removing much of the noise is to use two parallel-connected photomultipliers and a coincidence circuit gating only the simultaneous output signals of the two parallel photomultipliers. The most up-to-date photomultipliers have a low enough noise level to be used without any need for these protective procedures.

Interfering light signals or external noise reaching the receiver despite all protective precautions originate from the target, when the same is illuminated by any source other than the laser transmitter, from the space near the target and from the luminosity of the atmosphere between the target and the receiver caused either by external circumstances or by diffraction of the light transmitted by the laser. When this external noise has a fairly low lovel, the photomultiplier converts it into discrete electrical signals which have an amplitude distribution and a time distribution whose characteristics vary in dependance upon the noise level. These noise signals are further apart from one another in proportion as the external noise is smaller but are often difficult to distinguish from low-level laser echoes.

It is an object of this invention to increase the range of laser telemeter systems. It is more particularly an object of the invention to reduce the effect of external noise on the useful sensitivity of laser telemeter receivers.

The laser effect, the term meaning light amplification by stimulated emission of radiation, occurs of course after population reversal has been produced in a body of suitable material by a supply of energy called "pumping" between a fundamental energy band and an excited energy band. The return of an atom from the excited state to the fundamental state is accompanied by the emission of a photon at a frequency corresponding to the energy difference between the excited band and the fundamental band, and the photon can initiate the emission of another photon of the same frequency and the same phase by another atom, so that there is an avalanche process. To form a laser oscillator, the specimen is placed between two parallel mirrors so as to obtain a looped oscillator. A substantially parallel beam of coherent light is transmitted through one of the mirrors which has a low transparency coefficient. Solid lasers, such as ruby lasers, are pumped optically by means of flash tubes, and to produce a very powerful and very brief light pulse the laser is prevented from beginning its emission before being pumped to the maximum, either by the interposition of a Kerr cell between the two mirrors or by one of the mirrors being replaced by a rotating reflector. It has been found by experience that a solid state laser which is triggered in this way can deliver at each emission—i.e., e.g. at each passage of the rotating reflector past the stationary mirror—two or more consecutive pulses whose number and spacing can be modified by varying the speed of rotation of the rotating reflector. Nevertheless the spacing between such consecutive pulses is somewhat wavering.

According to the invention a laser telemeter system comprises a laser transmitter, means for transmitting the laser pulses in pairs, means for measuring the time interval between the two pulses forming each transmitted pulse pair; an associated receiver comprising a telescope, at least one photomultiplier, a telemeter counter measuring the time interval between the transmission of a laser pulse and the reception of the pulse echo from a target, and means for using for the telemeter measurement only the second of two pulses separated by the last measured interval.

According to a preferred embodiment of the invention, said laser telemeter system further comprises a fast counter; means for starting said fast counter at each first pulse of a transmitted laser pulse pair and for stopping said fast counter and for starting said telemeter counter at the second pulse of each pair; a decoder of the number of time units counted by the fast counter between the two pulses of each pulse pair, each output of the decoder driving an AND-gate giving access to a delay line having a time constant equal to the number of time units required to be recorded in the fast counter to make such output operative, the photomultiplier output being connected in parallel to one input of each of the AND-gates and to the stop input of the telemeter counter via an AND-gate having its second input connected to the outputs of all the delay lines.

The pulse pair used for each distance measurement can take the form of two consecutive light pulses transmitted at a single triggering of a triggered solid state laser—in which event the pulses are very close together—or of two pulses coming from two consecutive triggerings of such a laser. In the latter event, the spacing between the individual pulses is much greater than in the former case and the fast counter is, with advantage, a decade counter, each decade being associated with a decoder driving a group of ten delay lines, the delay line groups of consecutive decades being associated in series.

The invention will be more clearly understood from the following description and accompanying drawings of one example of the invention wherein:

FIG. 1 is a block schematic diagram of a laser telemeter system, and

FIG. 2 shows a detail of part of the diagram of FIG. 1.

Referring to FIG. 1, a laser 1, e.g. an optically pumped ruby laser, transmits triggered pulses to illuminate a target 2 whose distance it is required to measure. A receiving telescope 3 aimed substantially parallel to the laser transmits the light energy which it receives to a photomultiplier tube 4 which converts the received light pulses into electrical signals. Also shown in FIG. 1 is a second photomultiplier tube 42 and a semi-transparent mirror 41 dividing the light delivered by the telescope 3 between the photomultiplier tubes 4 and 42. Also shown is an AND-gate 43, the outputs of the two photomultipliers being connected one each to the two inputs of AND-gate 43. The aim of this known circuit arrangement is to reduce error signals caused by internal photomultiplier noise, as signals from the photomultipliers pass through the AND-gate 43 only if they occur simultaneously. Unfortunately, this known system causes a power loss, due to the presence of the mirror 41, and is justifiable only in the absence of a photomultiplier 4 having a relatively low noise level.

Since the laser 1 is a triggered laser providing two consecutive pulses forming a pulse pair in response to each triggering the interval between the pulses of each pair serves to distinguish their echoes from interference. This interval is measured by means of a fast counter 5 which, via a decoder 6, controls the selection of a delay line 81-89 having a time constant equal to the measured interval. A very small proportion of the energy of the transmitted laser pulses is reflected by a substantially transparent strip 11 to a photoelectric cell 12 which delivers an electrical signal at each light pulse of the laser 1. The cell output signals go to the start and stop inputs of the fast counter 5 through a circuit which applies the first pulse of every pulse pair to the start input and the second pulse of every pulse pair to the stop input and which can take the form for example of a bistable circuit 13 driven as a demultiplier by the output signals of the cell 12 and having an output connected via a capacitor 14 to the start input of the fast counter 5. The other output of the bistable circuit 13 is connected via a capacitor 15 to the stop input of the fast counter 5 and to the start input of a telemeter counter 10 for measuring the time interval between the emission of the second pulse of every transmitted pulse pair and the return of the second-pulse echo. To distinguish the same from other signals picked up by the telescope 3, for example signals caused by external noise and first pulses of the pulse pairs or internal photomultiplier noise, the output of the photomultiplier 4—if the same is used on its own—or of the gate 43—if two photomultipliers are used in parallel—is connected to the two inputs of an AND-gate 9 having its output connected to the stop input of the telemeter counter 10, directly and indirectly via a number of parallel circuits each comprising in series an AND-gate 71–79 driven by a particular output of the decoder 6 and a delay line 81–89 having a time constant equal to the number of time units recorded in the fast counter 5 during which the corresponding decoder output is operative.

When just a single decoder 6 is used at the output of a fast counter 5, as many delay lines 81–89 are used as there may be counting time units in the interval to be measured. This solution of the problem is usually satisfactory when the pulse pair is produced by a single triggering of a solid state laser.

When the interval between the pulses of each pulse pair is required to be varied within wider limits, more particularly when each such pulse is required to be triggered separately, it is advantageous to use, in the manner shown in FIG. 2, a fast decade counter 5 and to decode each decade separately e.g. through the agency of three 10-output decoders 61–63, each output respectively marking, from 0 to 9, microseconds, hundreds of nanoseconds and tens of nanoseconds. The photomultiplier output is connected to the inputs of gates 710–719 driven by the ten outputs of the decoder 61 of the highest-order decade. The outputs of the gate 710 controlled by the zero output of the decoder 61 and the outputs of the lines 811–819 having delays of from 1 to 9 microseconds respectively are connected in parallel to one input of each of AND-gates 720–729 driven by the decoder 62, and the outputs of the gate 720 and the outputs of the lines 821–829 providing delays of from 100 to 900 nanoseconds respectively are connected in parallel to AND-gates 730–739 controlled by the tens-of-nanoseconds decoder 63.

We claim:

1. A double pulse laser telemeter system comprising a laser transmitter, means for transmitting the laser pulses in pairs, a fast counter for measuring the time interval between the two pulses forming each transmitted pulse pair; an associated receiver comprising a telescope, at least one photomultiplier, and a telemeter counter measuring the time interval between the transmission of a laser pulse and the reception of the pulse echo from a target; means for starting said fast counter at the first pulse of each transmitted pulse pair and for stopping said fast counter and starting said telemeter counter at the second pulse of each transmitted pulse pair and means controlled by the counting of said fast counter for stopping said telemeter counter after a time interval equal to the last time interval measured by said fast counter.

2. A double pulse laser telemeter ssytem comprising a laser transmitter, means for transmitting the laser pulses in pairs; a fast counter; a receiver comprising a telescope, at least one photomultiplier, and a telemeter counter; means for starting said fast counter at each first pulse of a transmitted pulse pair and for stopping said fast counter and for starting said telemeter counter at the second pulse of each pair; a decoder of the number of time units counted by the fast counter between the two pulses of each pulse pair; a plurality of delay lines having staggered time-constants; a plurality of input AND-gates respectively controlled by the outputs of said decoder for giving access to said delay lines, each output of said decoder controlling an input AND-gate giving access to a delay line having a time-constant equal to the number of time units required to be recorded in the fast counter to make said output operative; an output AND-gate having a first input connected to the outputs of all the delay lines and its output connected to the stop input of said telemeter counter; the photomultiplier output being connected in parallel to one input of each of said input AND-gates and to the second input of said output AND-gate.

3. A double pulse laser system according to claim 2 in which said fast counter is a decade counter, each decade being associated with a decoder driving a group of ten delay lines, the delay line groups of consecutive decades being associated in series.

References Cited

UNITED STATES PATENTS 3,168,735   2/1965   Cartwright _____ 343—14 XR
3,402,630   9/1968   Blau et al. _____ 356—5 XR
3,409,368   11/1968   Fernandez _____ 356—5

RODNEY D. BENNETT, Jr., Primary Examiner

J. G. BAXTER, Assistant Examiner